United States Patent [19]

Yoshio et al.

[11] Patent Number: 5,043,826
[45] Date of Patent: Aug. 27, 1991

[54] METHOD AND APPARATUS FOR RECORDING AND REPRODUCING PICTURE INFORMATION AND TIMELY REPRODUCING IMAGES BY GRAPHIC CODES

[75] Inventors: Junichi Yoshio; Sumio Hosaka; Hisao Matsuoka; Youichirou Tsuda; Shoichi Katagiri, all of Tokorozawa; Satoru Nomura, Yamanashi, all of Japan

[73] Assignees: Pioneer Electronic Corporation, Tokyo; Pioneer Video Corporation, Yamanashi, both of Japan

[21] Appl. No.: 304,083

[22] Filed: Jan. 31, 1989

[30] Foreign Application Priority Data

Apr. 25, 1988 [JP] Japan ................. 63-102180

[51] Int. Cl.$^5$ .............................................. H04N 5/76
[52] U.S. Cl. ...................................... 358/335; 358/342
[58] Field of Search ............... 358/335, 142, 147, 903, 358/342; 360/35.1, 10.1; 369/49, 48, 50

[56] References Cited

U.S. PATENT DOCUMENTS 4,635,136  1/1987  Ciampa et al. ................. 358/342
4,872,067 10/1989  Okatani ........................... 358/341

FOREIGN PATENT DOCUMENTS 0214178 10/1985  Japan ................. 358/342
0080690  4/1986  Japan ................. 358/335

*Primary Examiner*—Roy N. Envall, Jr.
*Assistant Examiner*—Huy Nguyen
*Attorney, Agent, or Firm*—Fleit, Jacobson, Cohn, Price, Holman & Stern

[57] ABSTRACT

Method of recording and reproducing picture information and a recording medium on which the picture information is recorded by the method, and an apparatus for playing such a recording medium. In addition to video format signal and a coded information signal, graphic codes including picture information are recorded on the recording medium correspondingly to playback sections of the video format signal, the graphic codes being inserted as the subcode of the coded information signal. At the time of playback of the recording medium, a video signal according to the graphic codes corresponding to the playback section of the video format signal is generated each time one playback section of the video format signal is played back. Preferably, presence or absence of the graphic codes is displayed each time one playback section of the video format signal is played back.

7 Claims, 13 Drawing Sheets

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | PARITY Q | | | | | |
| 4 | TCB-0 | TCB-1 | TCB-2 | | | |
| 5 | TCB-3 | TCB-4 | TCB-5 | | | |
| 6 | TCB-6 | TCB-7 | TCB-8 | | | |
| 7 | TCB-9 | TCB-10 | TCB-11 | | | |
| 8 | TCB-12 | TCB-13 | TCB-14 | | | |
| 9 | TCB-15 | 0 | 0 | 0 | 0 | |
| 10 | 0 | 0 | 0 | 0 | 0 | 0 |
| ⋮ | | | | | | |
| 19 | 0 | 0 | 0 | 0 | 0 | 0 |
| 20 | PARITY P | | | | | |
| ⋮ | PARITY P | | | | | |
| 23 | PARITY P | | | | | |

Fig. 5

|SYMBOL| R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | \multicolumn{6}{c|}{PARITY Q} |
| 3 | | | | | | |
| 4 | \multicolumn{6}{c|}{COLOR 0} |
| 5 | | | | | | |
| 6 | | | | | | |
| ⋮ | | | | | | |
| 17 | | | | | | |
| 18 | \multicolumn{6}{c|}{COLOR 7} |
| 19 | | | | | | |
| 20 | \multicolumn{6}{c|}{PARITY P} |
| ⋮ | | | | | | |
| 23 | | | | | | |

Fig. 4

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q |||||| 
| 3 | |||||| 
| 4 | CHANNEL || COLOR 0 ||||
| 5 | CHANNEL || COLOR 1 ||||
| 6 | 0 | ROW |||||
| 7 | COLUMN ||||||
| 8 | FONT ||||||
| ⋮ | ||||||
| 19 | ||||||
| 20 | PARITY P ||||||
| ⋮ | ||||||
| 23 | ||||||

Fig. 7

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 8

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | | | | | | |
| 19 | 0 | 0 | 0 | 0 | 0 | 0 |
| 20 | PARITY P | | | | | |
| ⋮ | | | | | | |
| 23 | | | | | | |

| TCB | MODE | SUBCODE PICTURE | MOTION PICTURE |
|---|---|---|---|
| 0 0 | TRANSPARENT MODE | 0 % | 100 % |
| 1 0 | MIXING MODE | M % | (100−M) % |
| 1 1 | NON-TRANSPARENT MODE | 100 % | 0 % |

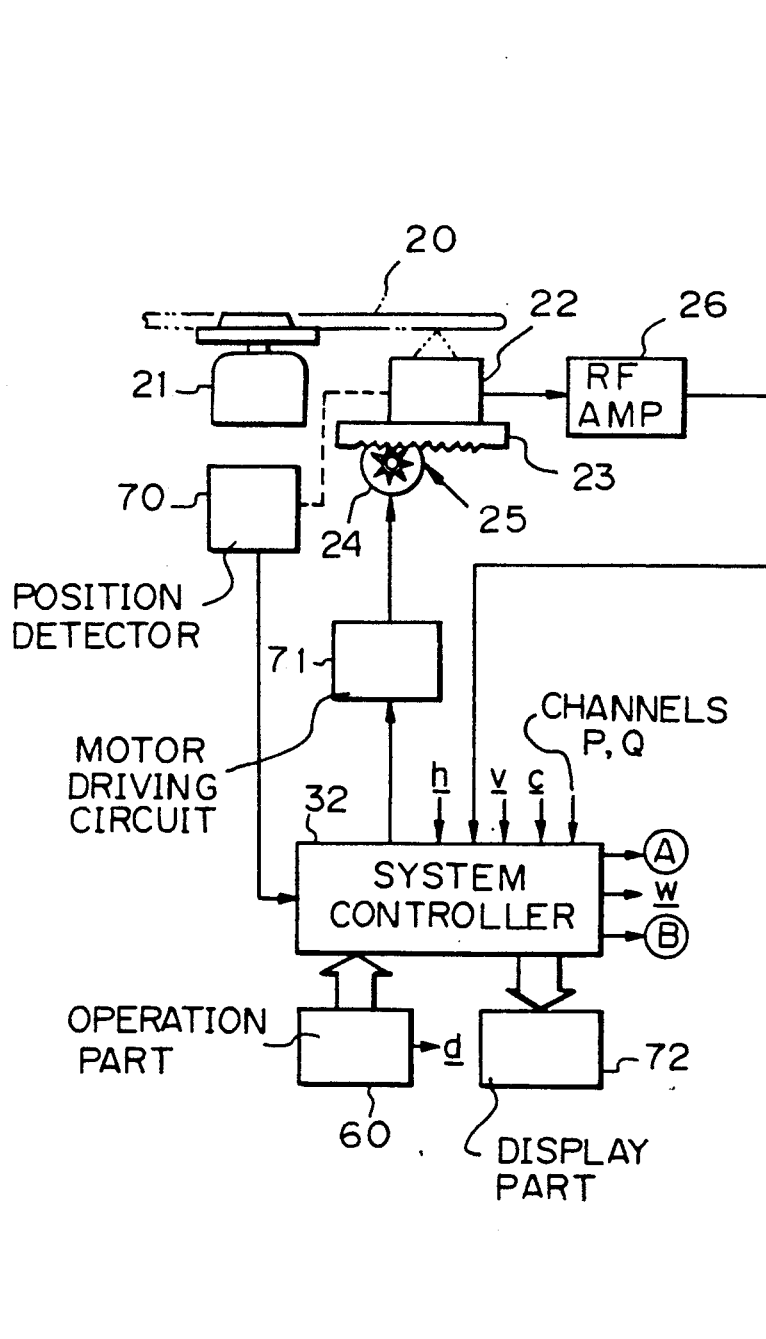

Fig. 16A — MOVING PICTURE / SUBCODE / DREAMS— WHAT WEAVES THE HUMAN NATURE
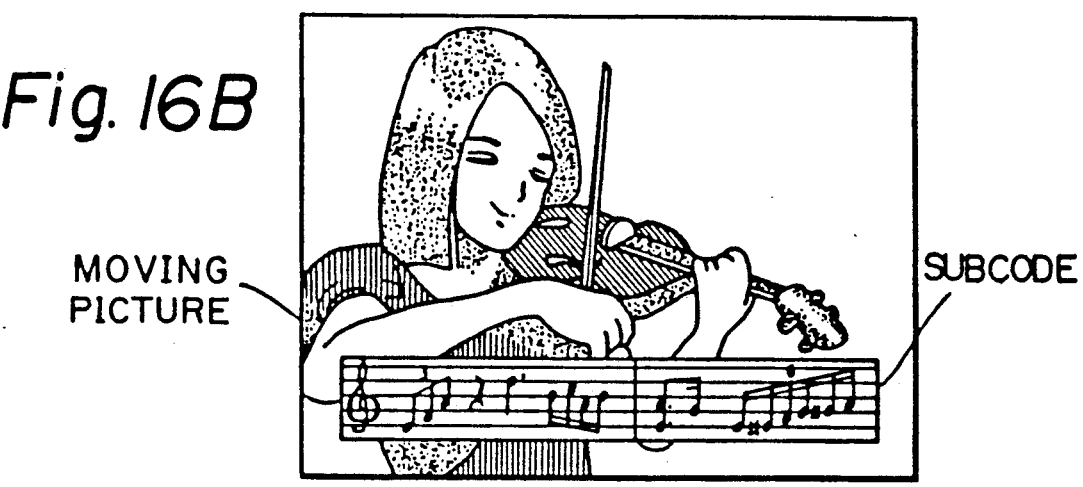
Fig. 16B — MOVING PICTURE / SUBCODE
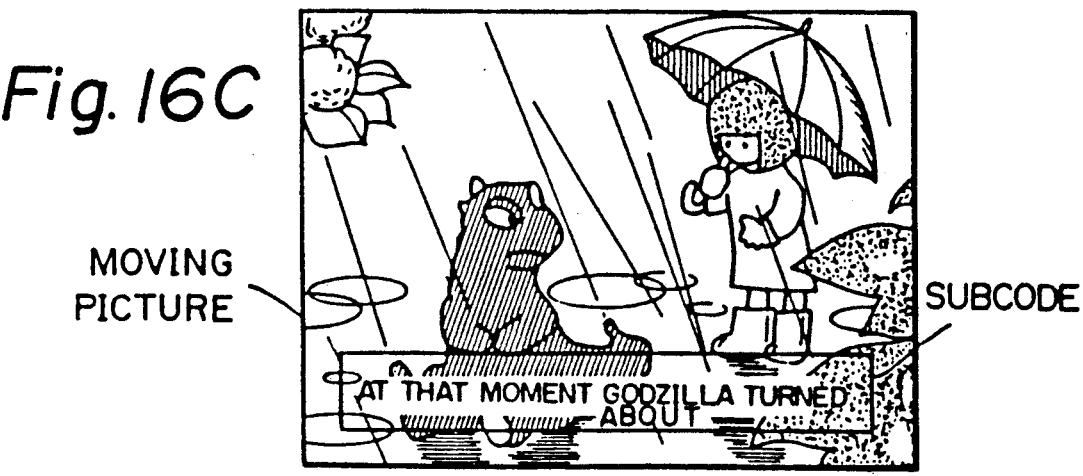
Fig. 16C — MOVING PICTURE / SUBCODE / AT THAT MOMENT GODZILLA TURNED ABOUT

METHOD AND APPARATUS FOR RECORDING AND REPRODUCING PICTURE INFORMATION AND TIMELY REPRODUCING IMAGES BY GRAPHIC CODES

BACKGROUND OF THE INVENTION

1. Field of the Invention

The present invention relates to method and apparatus of recording and reproducing picture information on and from a recording medium such as a digital audio disc, and so on, and relates to a recording medium.

2. Description of Background Information

A system is proposed in which picture information is recorded and reproduced in the form of a subcode on and from a digital audio disc having a diameter of 12 cm, generally called compact disc (abbreviated as CD hereinafter). The subcode is made up of eight subcode bits, and bit groups forming the subcode are divided into eight channels denoted respectively by letters P, Q, R, S, T, U, V, and W. In the method in which the picture information is recorded and reproduced in the form of the subcode, data corresponding to picture information is configured such that a symbol is formed by 6 bits of channels R through W out of the 8 bits forming the subcode, and 98 symbols are treated as one block, as illustrated in FIG. 1. Two symbols in the 98 symbols are used as a sync signal, and 24 symbols obtained by dividing the remaining 96 symbols, by four are treated as a minimum unit of data, i.e. a "pack", which constitutes one instruction of picture processing.

More specifically, the first symbol (referred to as symbol 0 hereinafter) of the 24 symbols shows one of several modes. A symbol 1 following this symbol 0 forms instruction which indicates the sort of the instruction. Symbols 2 and 3 following the symbol 1 constitute a parity Q which is an error correction code. Symbols 4 through 19 following the parity Q constitute a data field, and include information such as color information. Finally, symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, the original image is to be maintained, and all data in the "pack" are 0 for this mode.

The "line-graphics mode" is provided for such a case that a liquid crystal display is provided on the front face of the player, to display notes such as an explanation of a music selection. As shown in FIG. 2, a picture area being long sideways is formed by pixels which are arranged in 288 columns and 24 rows. In other words, each row includes 288 pixels and each column includes 24 pixels. The term "pixel" means the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and in the column direction, and this area is designated as "screen area". For providing the scroll function, a line of "fonts" is added to the upper and lower outer peripheries and the right and left peripheries of the Screen area, to form a picture area having 50 "fonts" in the direction of row, and 4 "fonts" in the direction of column. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there is an instruction for painting out the whole picture area by one certain color, an instruction for drawing a picture in one "font" on the screen by using two different colors, an instruction for moving the whole picture upward, downward or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P form data including information relating to a pause between two music selections.

In the above-described system of recording and reproducing picture information as the subcode, as many as 16 picture channels can be designated at the most. Specifically, a "write font foreground/back-ground" instruction is used in the "TV-graphics mode", which has such a structure as illustrated in FIG. 4. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, subpicture channels can be designated by using four bits of the channels R and S of the symbols 4 and 5. By this feature, as many as sixteen picture channels can be designated. Sixteen sorts of pictures are previously recorded on a disc for example, and on the playing side, a desired picture channel can be selected at the time of playing by this scheme of designating the picture channel.

In addition, the sixteen colors indicated by the color number "0" through "5" are set by a "load CLUT color 0 through color 15 (load color look-up table color 0 through color 15)" instruction. The "load CLUT color 0 through color 15" instruction is an instruction having a structure illustrated in FIG. 5, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each of the color number is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4$ (=16) sorts of gray scales are available for each color, and preparation of $16^3$ (=4096) colors are possible since three colors (RGB) are used. In addition, a gray scale "0000" corresponds to the darkest state, and a gray scale "1111" corresponds to the brightest state.

On the other hand, a system has been invented by the applicants of the present application and others and a patent application has been filed for that invention, in which an FM modulated video format signal is recorded on a recording medium together with a digital audio signal with graphic codes including picture information being inserted thereto, using the above-described system of recording and reproducing picture information as the subcode, and which is arranged so that, at the time of the playback of the recording medium, pictures produced from the subcode can be inserted to the pictures produced from the video format signal. However, it has been discovered that if playback is started after a search operation is commenced for searching a desired playback section of the video format signal (such as a chapter), a problem arises that the reading of graphic codes recorded at a position corresponding to the beginning of a chapter becomes incomplete, and a part of a series of picture processing instructions is not read-out so that a incomplete picture is displayed.

OBJECT AND SUMMARY OF THE INVENTION

The present invention is based the recognition of the above mentioned problem, and an object of the present invention is to provide a picture information recording and reproducing system in which, at the time of the playback of the recording medium on which, in addition to a video format signal and a coded information signal, graphic codes including picture information are recorded as being inserted as the subcode of the coded information signal, pictures produced from the subcode can be displayed in a precise manner even if the playback operation is started after a search operation is issued for searching a particular playback section of the video format signal.

In order to attain the above object, a picture information recording and reproducing system according to the present invention is characterized in that, in addition to a video format signal and a coded information signal, graphic codes including picture information are recorded on a recording medium corresponding to playback sections of the video format signal, the graphic codes being inserted as the subcode of the coded information signal, and during playback of the recording medium, generating a picture signal according to the graphic codes during playback of each section.

According to another aspect of the invention, at the time of the playback of the recording medium, the presence or absence of the graphic codes is displayed each time of the playback of one playback section.

BRIEF DESCRIPTION OF THE DRAWINGS

FIG. 4 is a diagram showing the construction of "write font foreground/background" instruction;

FIG. 5 is a diagram showing "load color look-up table color 0 through color 7" instruction;

FIG. 7 is a diagram showing the sort of recording modes;

FIG. 8 is a diagram showing the construction of "load transparency control table";

FIGS. 11A through 11C, when combined, are a block diagram showing an apparatus for reproducing picture information recorded on a disc in accordance with recording and playback method according to the present invention;

FIG. 11 is a diagram showing the arrangement of FIGS. 11A through 11C;

FIGS. 15 and 16A through 16C are diagrams showing pictures obtained by the apparatus shown in FIGS. 11A through 11C.

DETAILED DESCRIPTION OF PREFERRED EMBODIMENTS

An embodiment of the method according to the present invention will be explained with reference to FIGS. 6 through 16C of the accompanying drawings.

Figure 1:
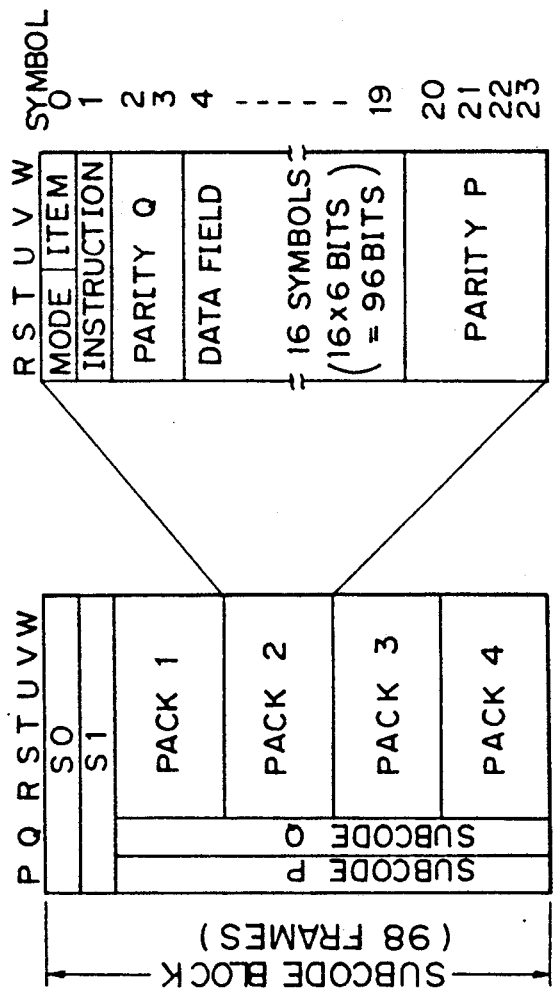
FIG. 1 is a diagram showing the recording format of subcode data.
Figure 2:
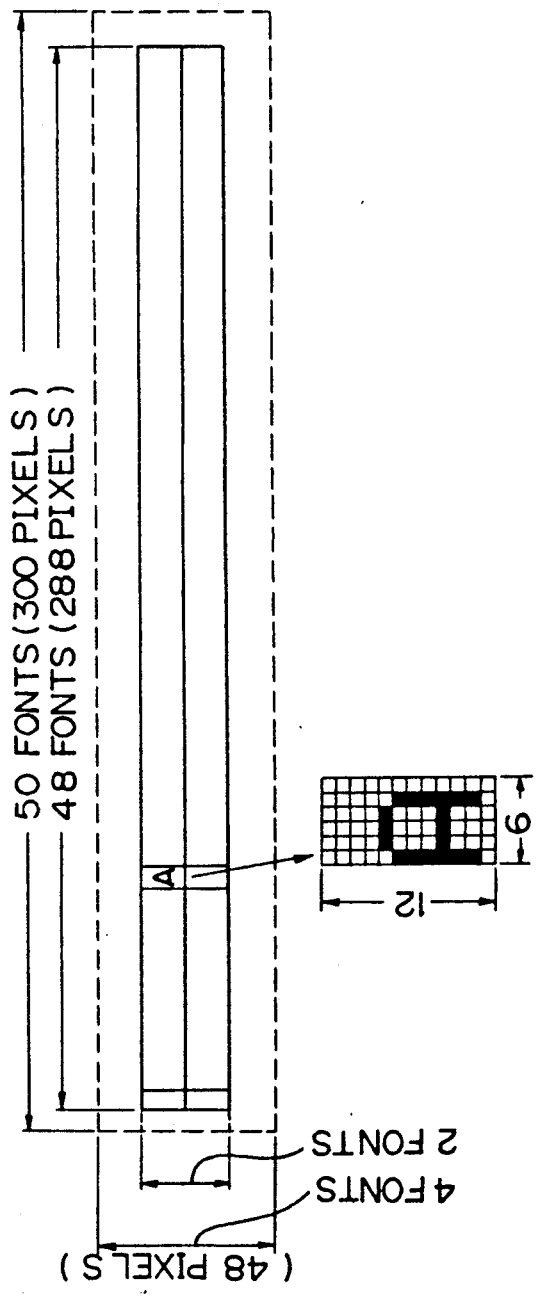
FIG. 2 is a diagram showing the structure of picture in the "line-graphics mode"
Figure 3:
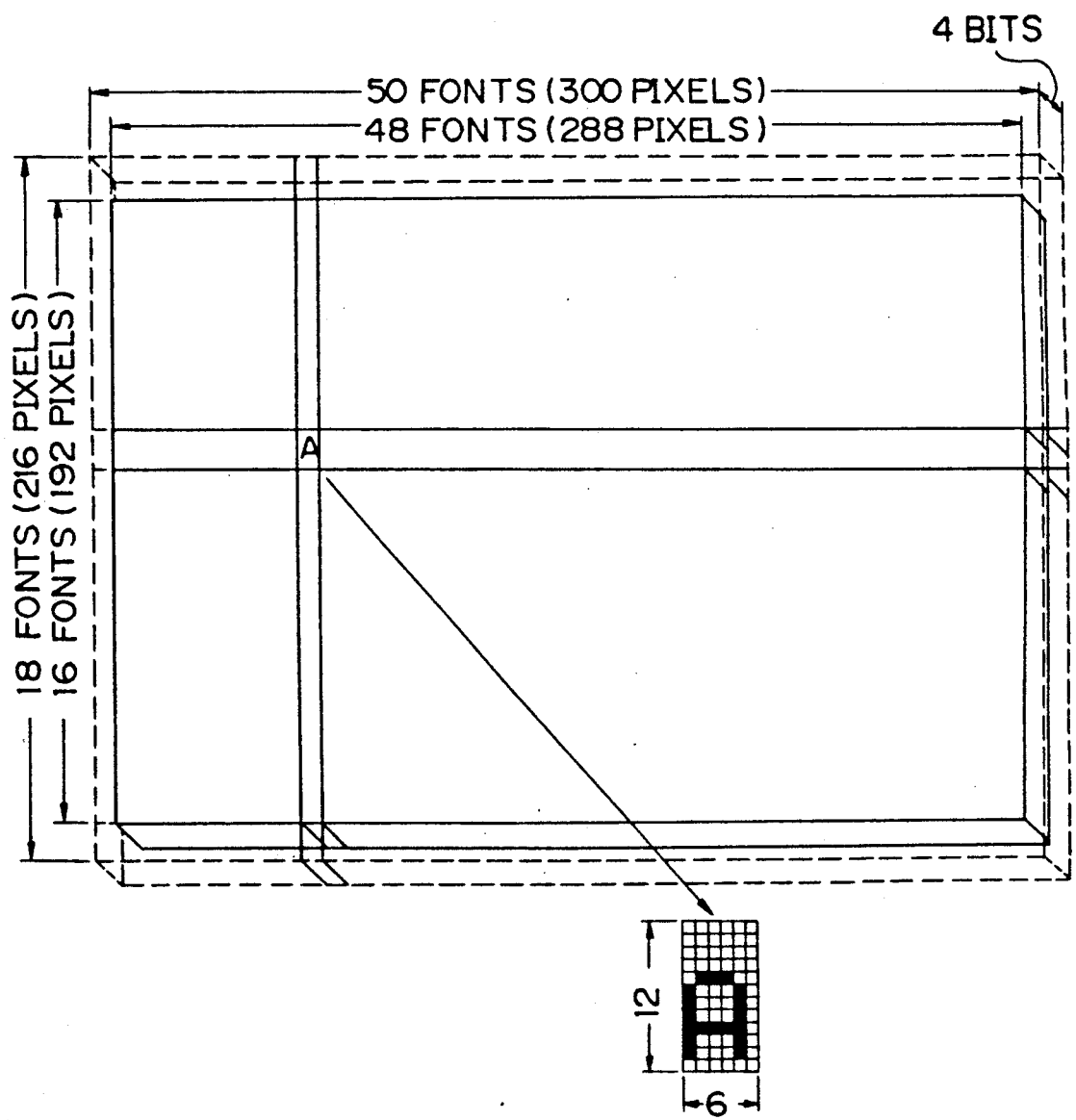
FIG. 3 is a diagram showing the structure of picture in the "TV-graphics mode"
Figure 6:
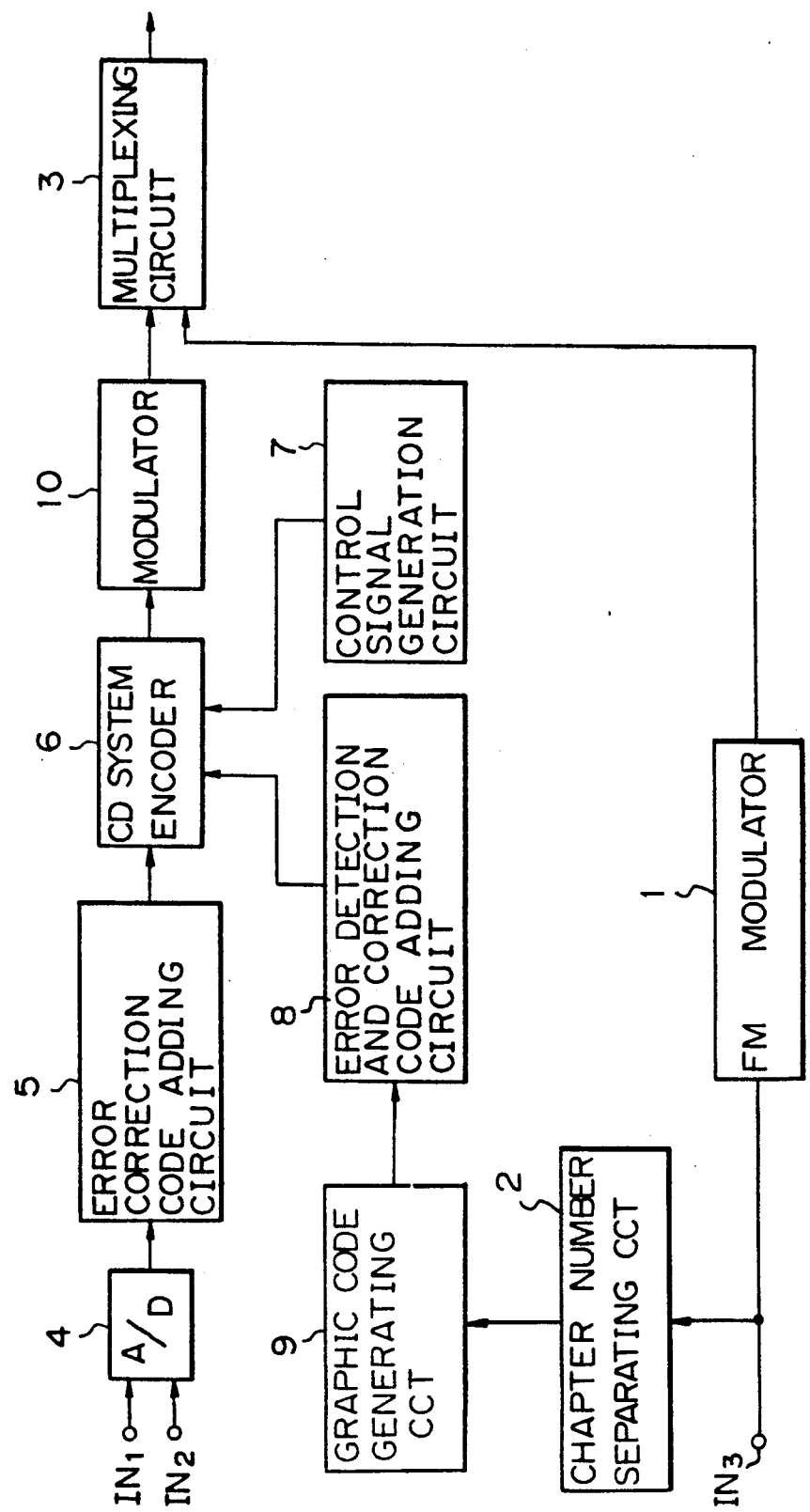
FIG. 6 is a block diagram showing the construction of a recording apparatus according to the present invention.

In FIG. 6, two-channel audio signals and a video format signal, outputted from a video tape recorder for example, are respectively supplied to input terminals $IN_1$, $IN_2$, and $IN_3$. The video format signal is supplied to an FM modulator 1 and a chapter number separating circuit (code separating circuit) 2. In the FM modulator 1, a carrier signal of a predetermined frequency is FM-modulated by the video format signal. An FM signal outputted by this FM modulator 1 is supplied to a multiplexing circuit 3. The chapter number separating circuit 2 is configured to separate codes indicating the chapter number from control codes, such as the Phillips codes, inserted in predetermined sections of the video format signal.

On the other hand, left and right-channel audio signals are supplied to an analog-to-digital converting circuit 4 The analog-to-digital converting circuit 4 is configured to perform the sampling of each of the left and right-channel audio signals at a sampling frequency of 44.1 kHz for example, to generate two digital data signals corresponding to two sampled values obtained by the sampling, and to output the digital data signals after processed by time division multiplexing. The output data of this A/D converter 4 is supplied to a CD system encoder 6 through an error correction code adding circuit 5 which interleaves the data, the error detection, and the addition of codes for the error correction. To the CD system encoder 6, an output signal of the control signal generating circuit 7 and an output signal of the error detection and correction code adding circuit 8 are supplied. The control signal generating circuit 7 is configured to generate data such as data indicating the time elapsed after the start of the supply of audio signals to the input terminals $IN_2$ and $IN_3$, and data indicating a pause between music selections or a portion within one music selection of the audio signals.

On the other hand, output data of the graphic code generation device 9 is supplied to the error correction and correction code adding circuit 8. The graphic code generation device 9 is configured to record a plurality of codes corresponding to a plurality of picture processing instruction groups respectively corresponding to each chapter of the video format signal, which are previously inputted by key operations for example, and to read-out codes corresponding to a picture processing instruction group corresponding to a chapter indicated by a chapter number data output from the chapter number separating circuit 2. The error detection and correction code adding circuit 8 is configured to interleave and error detection of the output data of the graphic code generation device 9 and the addition of the correction code.

The CD system encoder 6 is configured to form a recording signal by making the output of the control signal generation circuit 7 data of the channels Q and P, and making the output of the graphic code generating device 9 through the error detection and correction code adding circuit 8 data of the channels R through W, and inserting that data into the digital data from the A/D converter 4. Output signal of this CD system encoder 6 is supplied to a modulator 10 and converted to an EFM (Eight to Fourteen Modulation) modulation signal. The output signal of this modulator 10 is supplied to the multiplexing circuit 3, and processed by a frequency multiplexing with the FM-modulated video format signal.

The output signal of the multiplexing circuit 3 is supplied to an optical disc recorder of known arrangement (not shown) in which the strength of a light beam irradiated on the recording surface of a disc rotated at a constant linear velocity for example, is modulated by this signal. As a result, the graphic codes including picture information corresponding to chapters of the video format signal are recorded on the recording disc as the subcode of the digital audio signal, in addition to the video format signal and the digital audio signal as the coded information signal.

The graphic code generating device 9 is configured to generate codes corresponding to picture information processing instructions in the conventional system of recording and reproducing picture information using the subcode, and also codes corresponding to picture information processing instructions in a system of recording and reproducing picture information using the subcode, which is invented by the applicants of the present application and others, and for which a patent application has been already filed.

In the above-mentioned system of the prior application, for enabling the display of the picture produced from the video format signal and the picture produced from the subcode at the same time in a single picture, a code to be inserted as the symbol 0 is set in order to designate an additional mode, that is, "graphic mode with motion picture" as shown in FIG. 7, in addition to the "zero mode" the "line-graphics mode", the "TV-graphics mode" and the "user's mode" which are also used in the conventional system.

The structure of pictures in the "graphics mode with motion picture" is identical with that in the "TV-graphics mode", and an instruction designated as "load transparency control table" is provided. This "load transparency control table" instruction is an instruction for designating the mode for each pixel in picture area. Three modes are designated by this instruction, and those are namely, "transparent mode", "mixing mode", and "nontransparent mode". In these three modes, different values are selected for the mixing ratio between a video format signal obtained by the subcode and a video format signal which is recorded by multiplexing together with the coded information signal including the subcode.

Figures 9, 10:
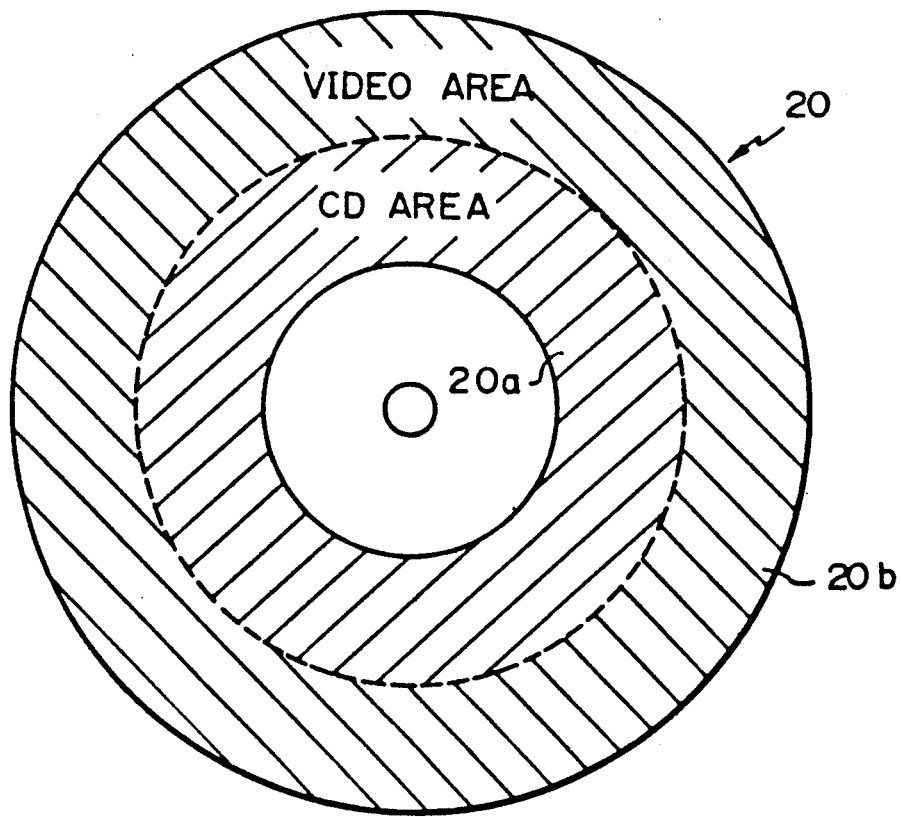
FIG. 9 is a diagram showing the correspondency between the bit pattern of TCB and the mixing ratio.
FIG. 10 is a diagram showing recording area of a composite disc.

The bits in the channels R through W of each of the symbols 4 through 8 and the channels R and S of the symbol 9 constitute a series of codes TCB-0 through TCB 15 which respectively designate one of modes which will be described later for each of the group of pixels to which one of colors, which are registered as color number "0" through color number "15", is allotted. FIG. 9 shows a relationship between bit patterns of the codes TCB-0 through TCB-15 and the modes designating the mixing ratio, and the mixing ratio in each mode.

By the recording system shown in FIG. 6, a composite disc 20 as illustrated in FIG. 10 can be produced. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups corresponding to each area by the repetition of index codes which respectively indicate start and end times of small portions which together constitute each area. In addition, the index codes of the audio lead-in area include information showing whether the disc itself is a composite disc or a disc of another type.

Figure 11B:
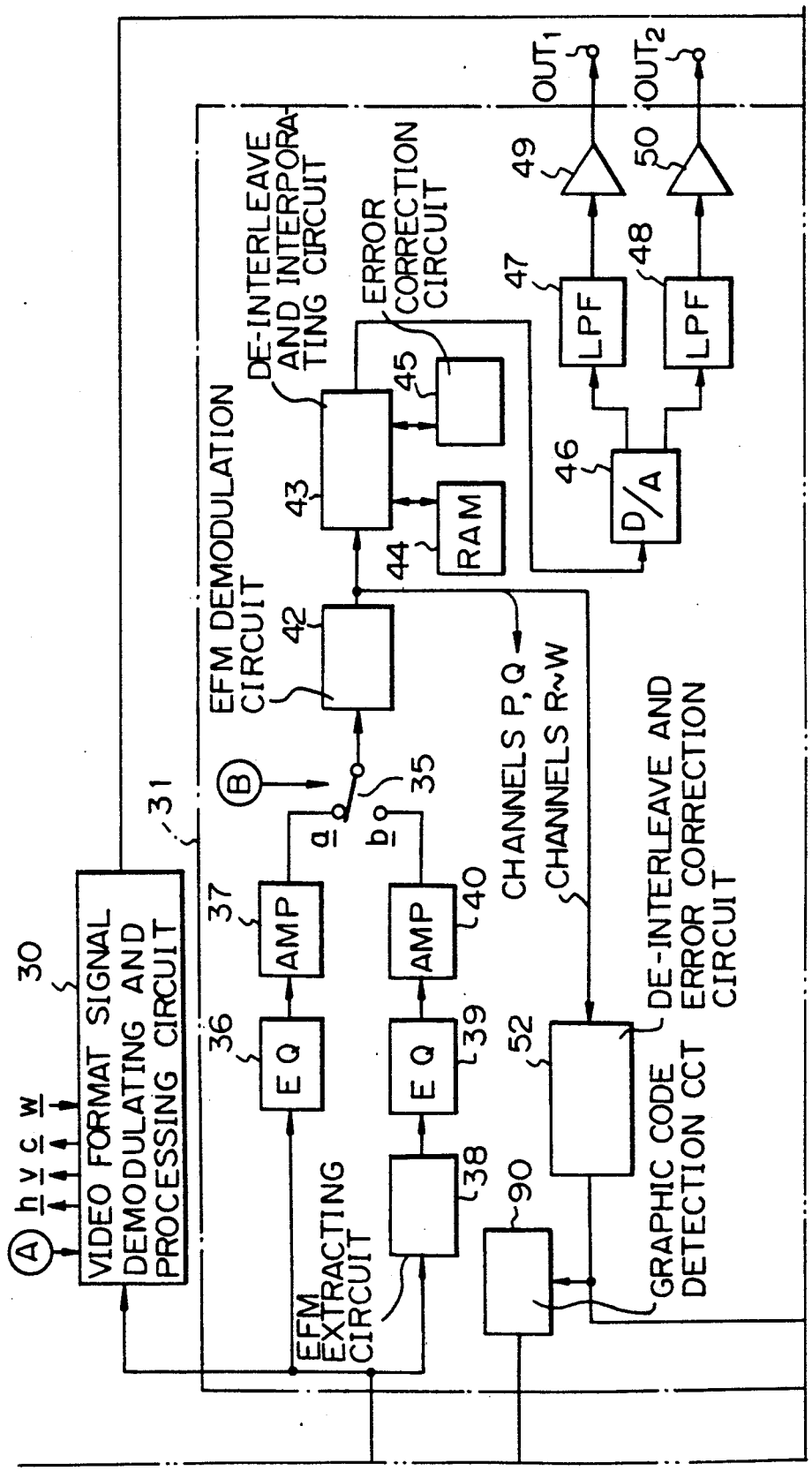
Figure 11C:
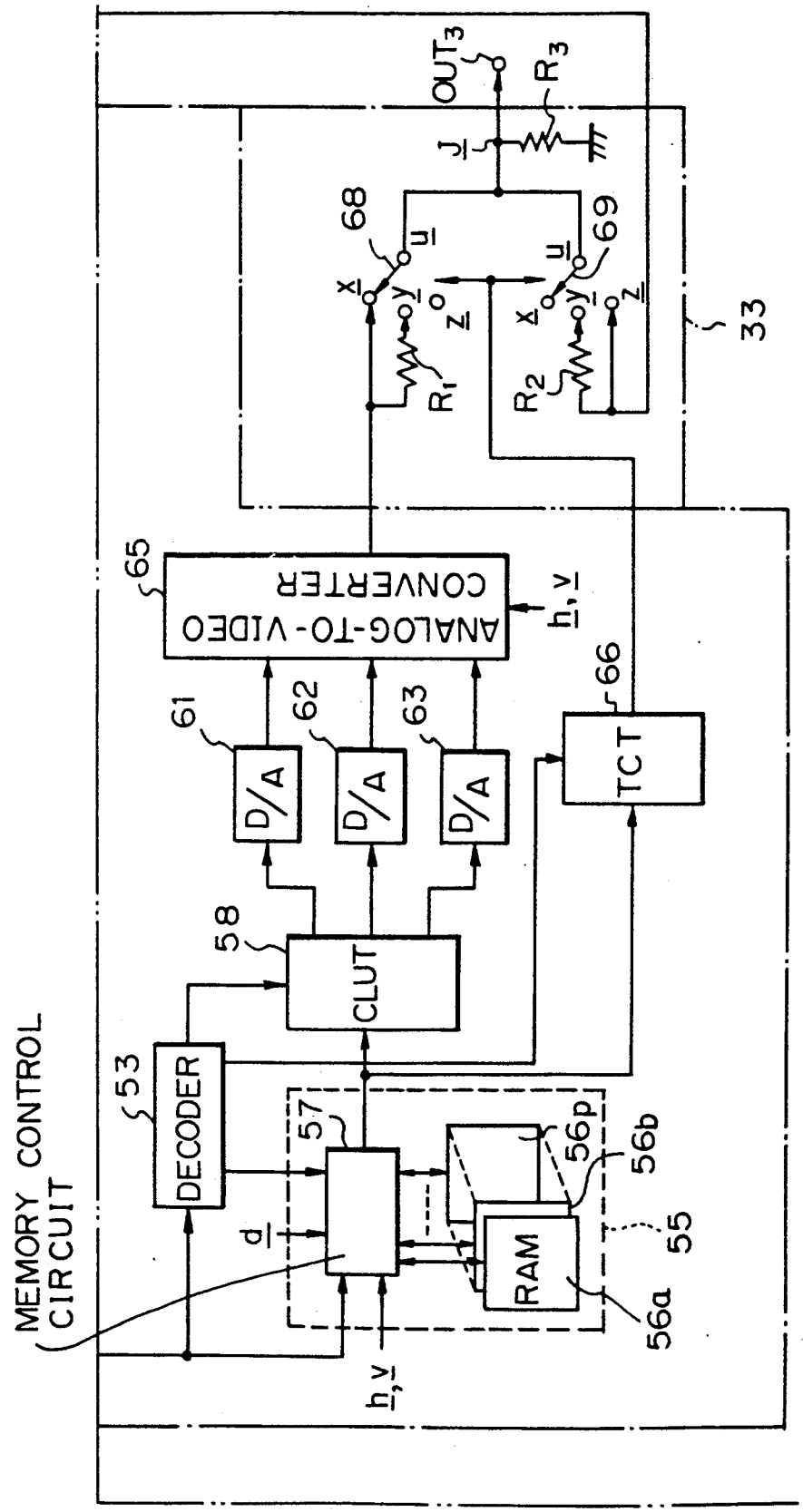

FIGS. 11A through 11C show a disc player capable of playing the composite disc. As illustrated in these figures, a disc 20 is rotated by a spindle motor 21, and information recorded thereon is read-out by means of a pickup 22. The pickup 22 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is linearly movable in the direction of disc radius by the drive of a transmission mechanism 25 which in turn has a slider motor 24 as a source of driving force, and made by a combination of rack and pinion gears. A read-out RF (radio frequency) signal output by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signals output by the demodulation circuit and the video format signal read-out from the memory in accordance with a changeover command from a system controller 32. The video format signal outputted by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to an EFM demodulation circuit 42 which performs the demodulation process, to obtain a PCM data that is digital data including audio information of left and right channels which is for example time-division multiplexed, and the subcode. The digital data including audio information output by this EFM demodulation circuit 42 is supplied to a de-interleave and interpolating circuit 43. The de-interleave and interpolating circuit 43 is configured to change back, in cooperative with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through amplifiers 49 and 50.

On the other hand, in the subcode output by the EFM demodulating circuit 42, two bits corresponding to channels P and Q are supplied to the system controller 32, and six bits corresponding to channels R through W are supplied to a de-interleave and error correction circuit 52 in which the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack, and to supply to each part signals respectively indicative of the modes and the instruction. The output data of the de-interleave and error correction circuit 52 is supplied to a graphic code detection circuit 90. The graphic code detection circuit 90 is configured to generate a graphic code detection signal when a code constituting a picture processing instruction is outputted from the de-interleave and error correction circuit 52. The output of this graphic code detection circuit 90 is supplied to the system controller 32.

Furthermore, the output data of the de-interleave and error correction circuit 52 is supplied to a picture memory device 55. The picture memory device 55 includes sixteen RAMs 56a through 56p having addresses respectively corresponding to all pixels on a picture having 50 "fonts" by 18 "fonts" in the row and column directions, and four bits of data can be stored in each address, and a memory control circuit 57 for sensing data indicating the color number of each pixel of each picture channels in the output data of the de-interleave and error correction circuit 52 according to the modes and the instruction indicated by the output of the mode/instruction decoder 53 and writing them in the corresponding addresses of the RAMs 56a through 56p, and for reading out sequentially in a predetermined order one memory content of the RAMs 56a through 56p corresponding to the picture channel designated by a data d by the key operation in an operation part 60 in accordance with horizontal and vertical sync signals h and v.

The data output by the picture memory device 55 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the modes and the instruction indicated by the output signal of the mode/instruction decoder 53, and hold the color data corresponding to each color number, and configured to select and output color data of the color number designated by the data read-out from the picture memory 55.

The output data of this CLUT 58 is made up of three data types respectively representing the level of one of the R, G, B color signals by using four bits. The three data types output by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signals having a phase difference of 90° by means of the two color difference signals, and combining the color carrier signal and the luminance signal by the summation, and adding sync signals thereto. By this analog-to-video converting circuit 65, the output signals o f the D/A converting circuits 61 through 63 are converted to a video signal and sent subsequently.

In addition, the output of the de-interleave and the error correction circuit 52 is also supplied to a transparency control table 66 (this table being referred to hereinafter as the TCT). The TCT 66 is configured to detect a "load TCT" instruction in the output data of the de-interleave and error correction circuit 52 in accordance with the modes and instruction indicated by the output signal of the mode/instruction decoder 53, hold transparency control bits TCB-0 through TCT-15, and output be selecting one of the TCB-0 through TCB-15 being held, corresponding to a color number indicated by the data read-out from the picture memory device 55.

The output signal of the TCT 66 is supplied to a video switch 33 as a control signal. In addition to the output signal of the TCT 66, the video format signal obtained from the subcode and output by the analog-to-video converting circuit 65, and the video format signal output by the video format signal demodulating and processing circuit 30 are supplied to the video switch 33.

In the video switch 33, the video format signal obtained from the subcode is supplied to a stationary contact x of the changeover switch 68, and also supplied to a stationary contact y through a resistor $R_1$. No connection is made to a stationary contact z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66. The video format signal output from the video format signal demodulating and processing circuit 30 is directly supplied to a stationary contact z of a changeover switch 69 and also supplied to its stationary contact y through a resistor $R_2$. No connection is made to a stationary contact x of the changeover switch 69. The changeover switch 69, like the changeover switch 68, is configured to move its movable contact u to be in contact with one of its stationary contacts x, v, z in accordance with the control signal. The movable contacts u, of each of the changeover switches 68 and 69 are mutually connected. A resistor $R_3$ is connected between a common junction J of the movable contacts u, u and ground. A mixed signal of the video format signal obtained from the subcode and the video format signal outputted from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts z, z are in contact with the stationary contacts y, y, the mixing ratio is equal to M which is determined by the resistors $R_1$ and $R_2$, and the resistance of the resistors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached to the video area can be detected The position detector 70 can have a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode outputted from the EFM demodulation circuit 42, disc designation information from the control part 60 indicating whether the disc to be played is a compact disc or a composite disc, and mode designation information from the operation part 60, indicating whether the reproducing area is either the CD area or the video area, or both CD and video areas in the case of the playback of a composite disc. In this system controller 32, the processor executes processing of the signals input in accordance with programs previously stored in the ROM, and performs the control operation of each part of the video format signal demodulating and processing circuit 30, the selector switch 35, a drive circuit (not shown) for driving the spindle motor 21, the driving circuit 71 for driving the slider motor, and the display part 72.

Figure 12:
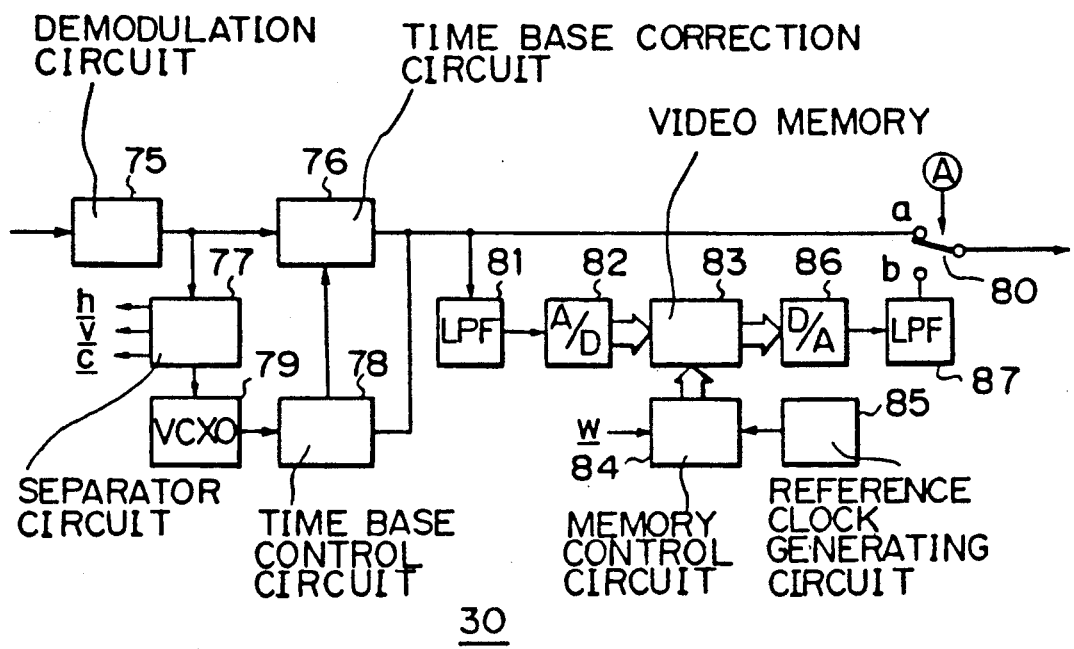
FIG. 12 is a block diagram showing a specific configuration of video format signal processing circuit 30 in the apparatus shown in FIGS. 11A through 11C.

FIG. 12 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and color burst signal of the video signal transmitted through the time base correction circuit 76. For more specific configuration, reference is directed for example Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially read-out data written in each address of the video memory 83 in accordance with a clock from a reference clock generating circuit 85, and for rewriting the contents of each address of the video memory 83 in response to a write enable signal w which is outputted from the system controller 32. The data read-out from the video memory 83 is converted to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having been processed through the video memory 83.

Figure 13:
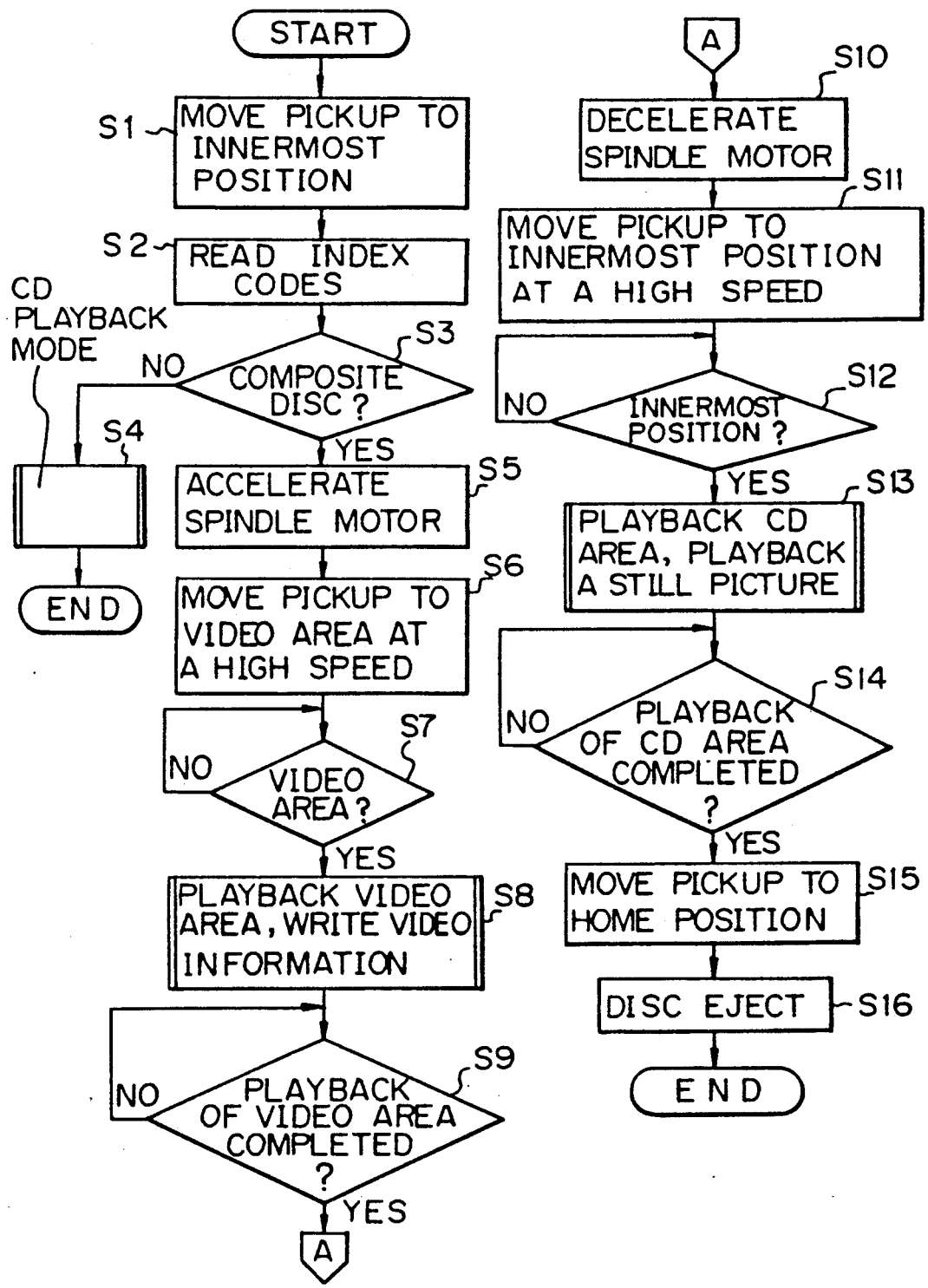
FIGS. 13 and 14 are flowcharts showing the operation of processor in system controller 32 of the apparatus shown in FIGS. 11A through 11C.
Figure 14:
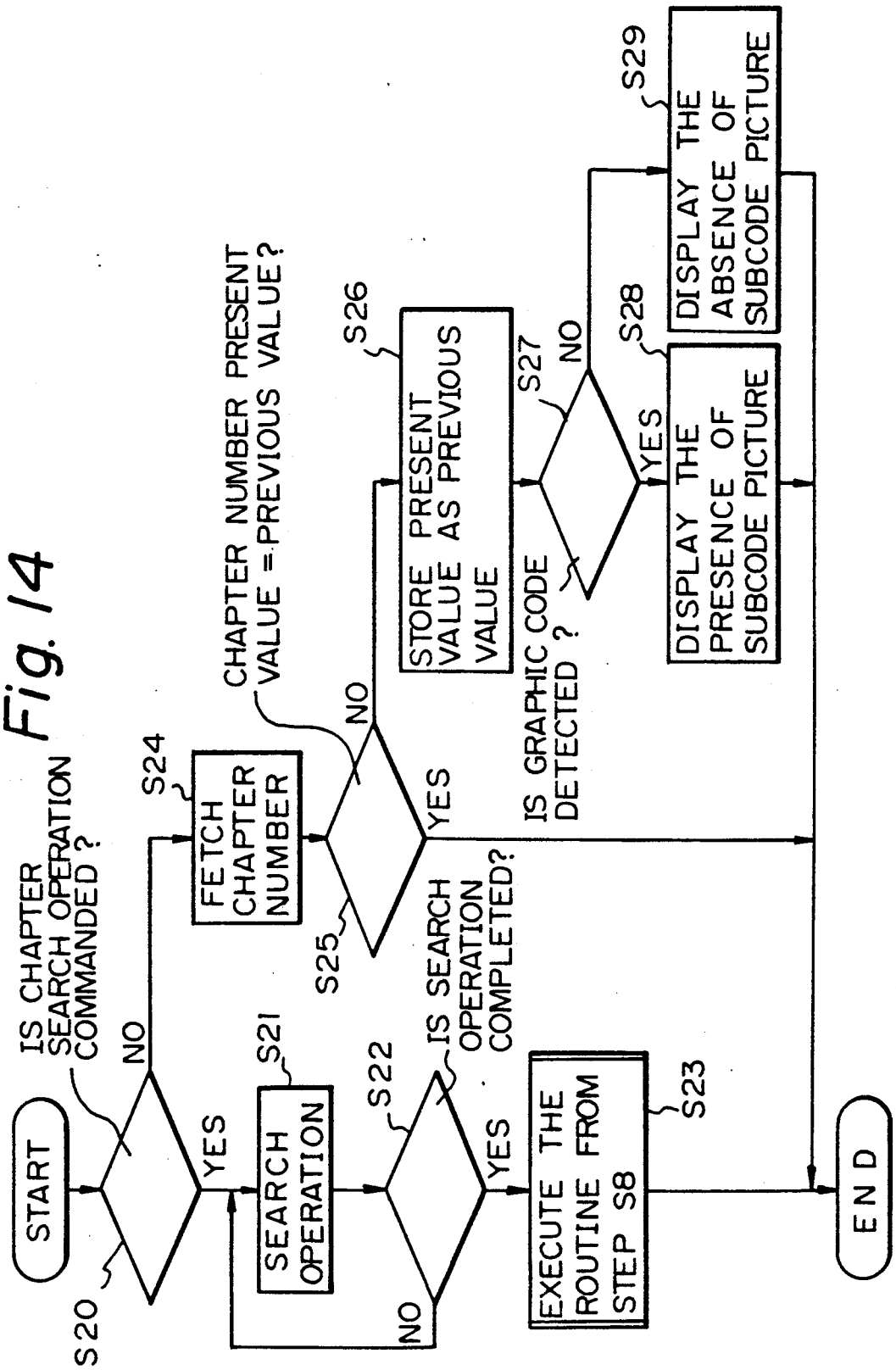

Operations of the processor in the system controller 32 in the above configuration will be specifically explained with reference to the flowcharts of FIGS. 13 and 14.

Assume that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in an audio lead-in area at an innermost peripheral area of the disc (step S2). Subsequently, the processor judges whether or not the disc being set is a composite disc or not, on the basis of the read information (step S3). If it is judged that the disc being set is a compact disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in step S3 that the disc being set is a composite disc, the processor immediately accelerates the slider motor 21 to a maximum rated speed of rotation for the video area (step S5). At the same time, the processor moves the pickup 22 toward the outer periphery of disc at a high speed by driving the slider motor 24 at a high speed (step S6). After these operations, when it is detected that the pickup 22 has reached to the video area by the detection signal from the position detector 70 (step S7), the processor starts the playback operation of the video area (step S8). During video area playback, the processor performs the control operation for writing the video information of at least one field (or one frame) long obtained from the disc in the video memory 83. This video information to be written may be, for example, first information in the video area, or designated by an address designation through the key operation of the operation part 60.

If it is detected in step S9 that the playback of the video area has been completed, then the processor decelerates the spindle motor 21 to the maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S14), the processor initiate the driving of the slider motor 24 to move the pickup 22 to its home position (step S15) unless any operational command is present. Furthermore, a loading mechanism (not shown in the drawings) performs disc ejection (step S16), to complete the playback operating sequence.

During the execution of the main routine, the processor proceeds to step S20, by an interruption by means of a timer for example, to judge whether or not a chapter search operation is commanded by a key operation in the operation part 60. If it is judged in step S20 that the chapter search operation is commanded, the processor moves the information detection point of the pickup 22 to a start point of the designated chapter, by transmitting the drive command to the motor driving circuit 71 while comparing the chapter number of the designated chapter and the chapter number data in the control data c outputted from the separator circuit 77 in the video format signal demodulating and processing circuit 30 (steps S21 and S22), and calls the routine after step S8, and executes it subsequently (step S23).

If it is judged in step S20 that the chapter search operation is not commanded, the processor fetches the chapter number data in the control data c (step S24). Then, the processor judges whether or not the present value of the chapter number obtained in step 23 is equal to the previous value of the chapter number stored in a predetermined address of the RAM in the system controller (step S25).

If it is judged in step S21 that the present and previous values of the chapter number are equal to each other, the processor immediately restarts the execution of the routine which was being executed immediately before the shift to the step S20. On the other hand, if it is judged in step S25 that the present and previous values of the chapter number are not equal to each other, the processor writes the present value of the chapter number in the predetermined address of the RAM in the system controller 32 as the previous value of the chapter number (step S26), and judges whether or not the graphic code detection signal is being output from the graphic code detection circuit 90 (step S27).

If it is judged in step S27 that the graphic code detection signal is being output, the processor transmits to the display part 72 a command for displaying the presence of picture information by the subcode (step S28), and restarts the execution of the routine which was being executed immediately before the shift to the step S20.

If it is judged in step S27 that the graphic code detection signal is not being output, the processor transmits to the display part 72 a command for displaying the absence of picture information by the subcode (step S29), and restarts the execution of the routine which was being executed immediately before the shift to the step S20.

In the operating sequence described above, playback of the information recorded in the CD area of the composite disc is performed in steps S10 through S14 after the playback of information recorded in the video area in steps S1 through S9.

When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by decoding the "write font foreground/background" instruction etc., picture data of 16 channels are in turn stored in the RAM 56a through 56p in the picture memory device 55. When one of the picture data of 16 channels is designated by data corresponding to the key operation in the operation part 60, picture data of the designated channel is sequentially output from the picture memory device 55, and in turn supplied to the CLUT 58. By this operation, color data of a color number indicated by the picture data is then output from the CLUT 58. A video format signal based on this color data is outputted from the analog video converting circuit 65, and supplied to the video switch 33.

Figure 15:
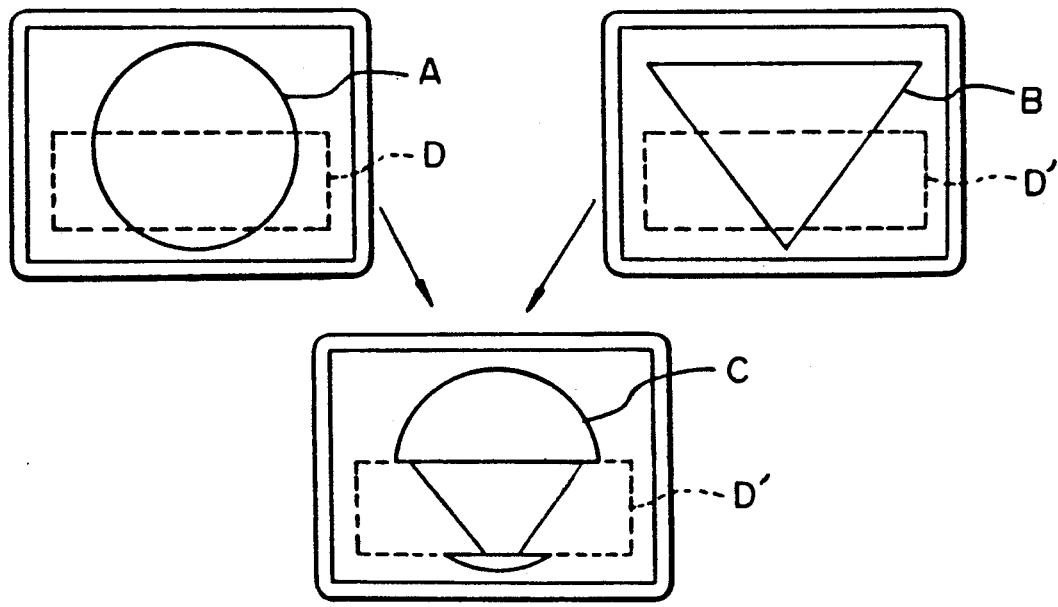

If the "load TCT" instruction is decoded in this state, the transparency control bits TCB-0 through TCB-15 respectively corresponding to each color number are then held in the TCT 66. Among the TCB-0 through TCB-15 being held, one corresponding to the color number indicated by the data read-out from the picture memory device 55 is selectively outputted from the TCT 66, and the mixing ratio in the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequently, a combination of pictures such as illustrated in FIG. 15 is made possible. Specifically, the mixing ratio is set to 100% for a portion corresponding to each pixel outside a region D of a picture A based on the video format signal output from the video format signal demodulating and processing circuit 30, and set to 0% for a portion corresponding to each pixel within the region D. On the other hand, the mixing ratio is set to 0% for a portion corresponding to each pixel outside a region D, of a picture B based on the video format signal outputted from the analog-to-video converting circuit 65, and set to 100% for a portion corresponding to each pixel within the region D' of the picture B. Then a picture C can be formed by combining the portion of the picture A outside the region D and and the portion of the picture B within the region D'.

In this way, it is possible to compose a picture as illustrated in FIGS. 16A through 16C, in which a translation of a dialogue, a musical score, or an explanation of a scene, etc., obtained from the subcode is inserted into a moving picture obtained by the video format signal recorded in the video area or a still picture obtained by the video memory 83.

Moreover, when the chapter search operation is commanded, the designated chapter is searched through operations of the steps S20 through S23, and the playback operation starts from the chapter searched out. Since the graphic codes are recorded as a subcode correspondingly to the chapters, incomplete reading of a series of graphic codes is prevented, so that the picture corresponding to the subcode is displayed precisely.

Moreover, since the presence or absence of the picture corresponding to the subcode is displayed through the operations of the steps S24 through S29, it can be readily recognized that the system is operating properly even if the picture by the subcode is not displayed during the playback of a chapter in which picture information is not recorded as the subcode.

As explained in detail in the foregoing, the system of recording and reproducing picture information according to the present invention is configured such that, in addition to a video format signal and a coded information signal, graphic codes including picture information are recorded on a recording medium correspondingly to playback sections of the video format signal, the graphic codes being inserted as the subcode of the coded information signal, and at the time of playback of the recording medium, a picture signal according to graphic codes corresponding to the playback section is produced. By this feature, it is possible to prevent an incomplete reading of a series of graphic codes when a desired playback section is searched for the playback. Thus, the picture by the subcode can be displayed precisely.

Furthermore, during playback of the recording medium, through the display of the presence and absence of the graphic codes, it can be readily recognized that the system is operating properly even if the picture corresponding to the subcode is not displayed during the playback of a playback section in which no picture information is recorded as the subcode.

What is claimed is:

1. A method of recording and reproducing picture information on a recording medium comprising the steps of:
   extracting an information signal representing playback sections from a video format signal to be recorded on a recording medium;
   generating graphic codes including picture information;
   recording said video format signal and a coded information signal on a recording medium coordinated with the playback sections of said video format signal in accordance with said information signal extracted from said video format signal, said graphic codes being inserted as the subcode of said coded information signal; and
   playing back the video format signal from said recording medium and simultaneously generating a signal according to said graphic codes corresponding to the playback section of said video format signal each time one playback section of said video format signal is played back.

2. A method as set forth in claim 1, further comprising a step for displaying, at the time of playback of said recording medium, presence or absence of said graphic codes each time of the playback of one playback section of said video format signal.

3. An apparatus for playing a picture information recording medium on which a video format signal and a coded information signal together with graphic codes including picture information are recorded, said graphic codes being inserted as the subcode of said coded information signal, said apparatus comprising:
   pickup means for reading signals recorded on said recording medium and generating a pickup output signal;
   video format signal demodulating means for demodulating said video format signal from said pickup output signal;
   means for driving said pickup means to read a particular playback section of said video format signal in response to a user's operation command;
   coded information signal demodulating means for demodulating said coded information signal from said pickup output signal;
   graphic code demodulating means for demodulating said graphic codes from an output signal of said coded information signal demodulating means; and
   picture signal generating means for generating a picture signal according to said graphic codes from an output signal of said graphic codes demodulating means each time one playback section of said video format signal is played back.

4. An apparatus as set forth in claim 3, further comprising display means for displaying, at the time of playback of said recording medium, presence or absence of said graphic codes each time one playback section of said video format signal is played back.

5. A method of recording and reproducing audio and video information to and from a recording medium comprising the steps of:
   generating a video format signal to be recorded on the disk including chapter numbers inserted therein to identify playback sections of the video format signal, a chapter number code being assigned to each playback section of the video format signal;
   generating graphic codes representative of picture information and instruction code information for superimposing the picture information on the video format signal, said graphic codes including mixing ratios for mixing the picture information of the graphic codes with the video format signal;
   extracting the chapter numbers from the video format signal;
   matching each chapter number with a corresponding graphic code for superimposing the picture information on a corresponding playback section of the video format signal;
   generating an audio signal to be recorded on the disk;
   digitizing the audio signal to generate a digital audio signal;
   inserting the graphic codes as a subcode to the digital audio signal to form a coded information signal;
   frequency modulating the video format signal to generate a frequency modulated video format signal;

superimposing the coded information signal on the frequency modulated video format signal;

recording the coded information signal and the frequency modulated video format signal with the superimposed coded information signal on the disk; and playing back the information from the disk comprising and simultaneously generating the picture information according to said graphic codes corresponding to the chapter of the video format signal specified by the chapter search number each time the corresponding playback section of the video format signal is played back.

6. The method of claim 5, and further comprising the step of displaying the presence or absence of said graphic codes during playback of said motion picture signal.

7. The method of claim 5, and further comprising the steps of:

issuing a chapter search command including a chapter search number upon a user desiring playback of a particular chapter of the video format signal; and playing back the video format signal from the playback section of the disk corresponding to the chapter search number.

* * * * *